Nov. 24, 1936.　　　　T. A. MARTIN　　　　2,061,975
AUTOMOBILE SERVICE LIFT
Filed Nov. 13, 1934　　　3 Sheets-Sheet 1
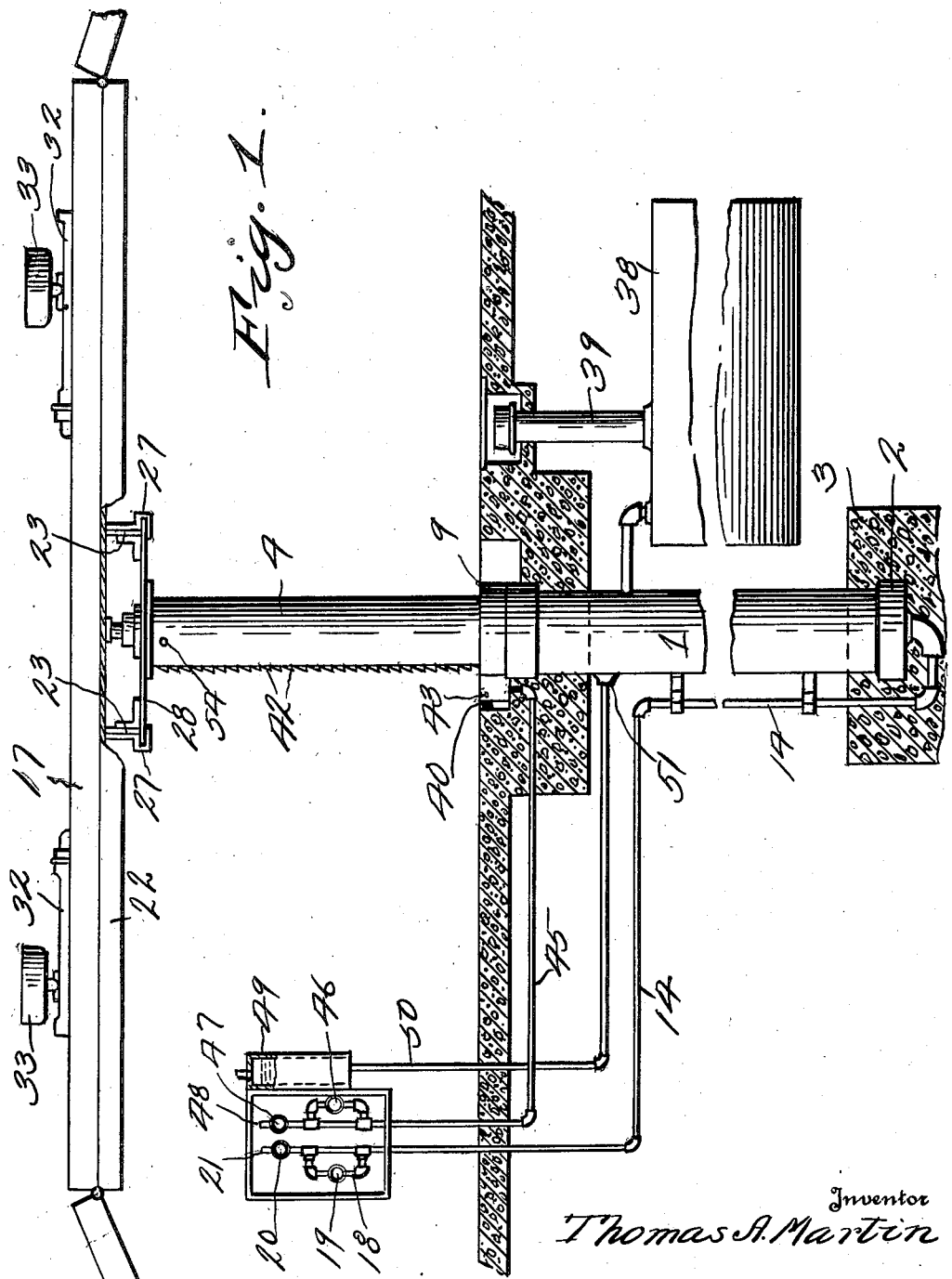
Inventor
Thomas A. Martin

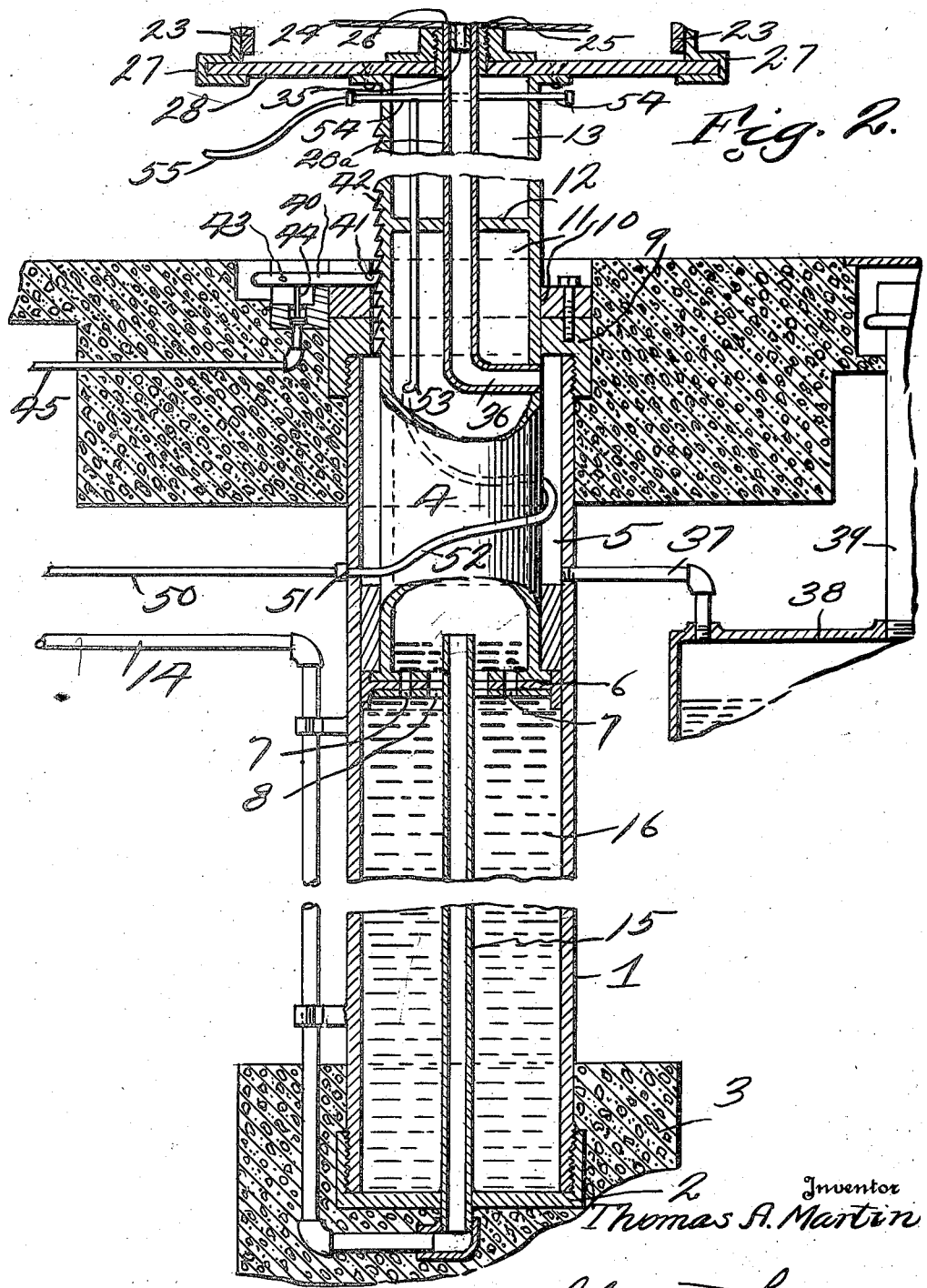

Nov. 24, 1936.  T. A. MARTIN  2,061,975
AUTOMOBILE SERVICE LIFT
Filed Nov. 13, 1934  3 Sheets-Sheet 3
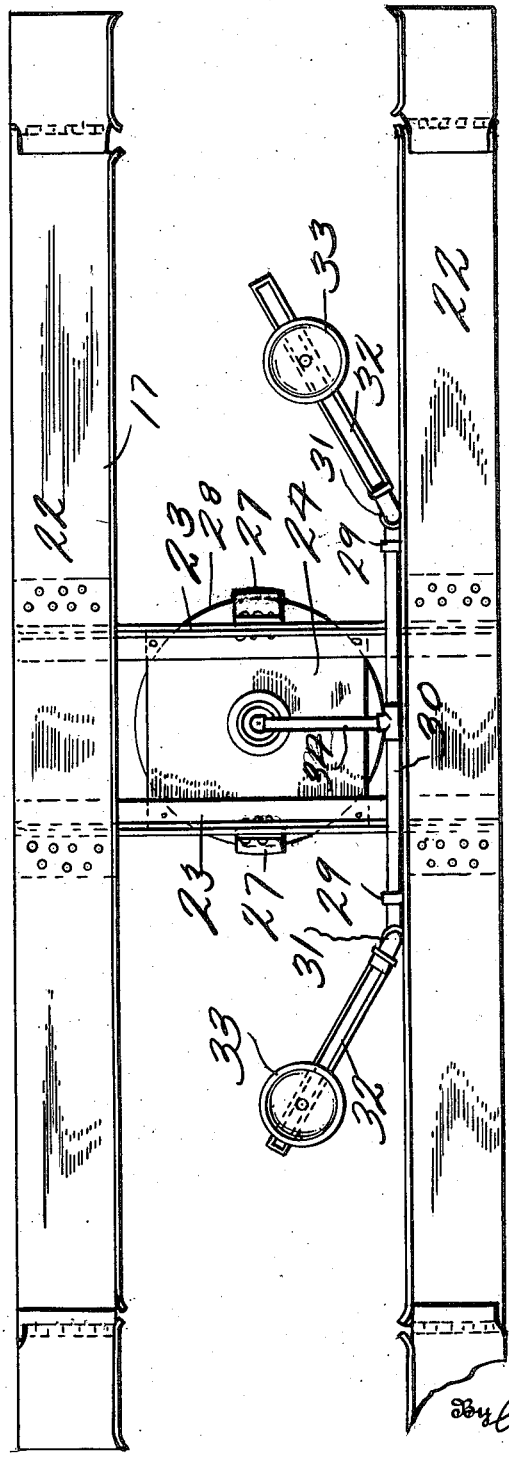
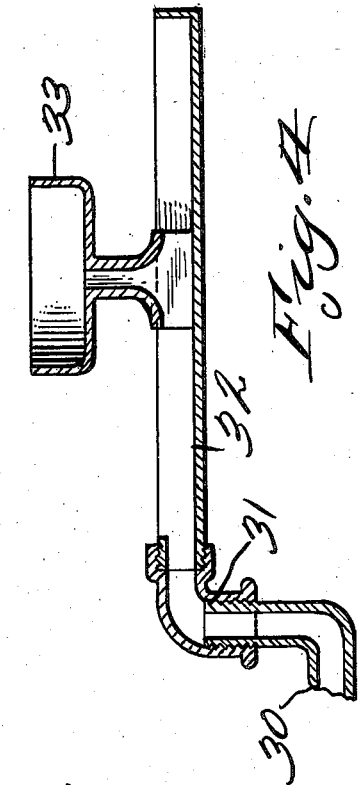
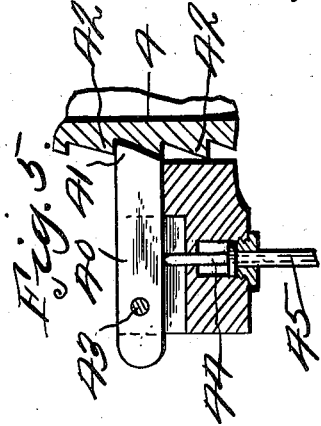
Inventor
Thomas A. Martin
By Philip A. F. Terrell
Attorney Patented Nov. 24, 1936

2,061,975

UNITED STATES PATENT OFFICE 2,061,975

AUTOMOBILE SERVICE LIFT

Thomas A. Martin, Ozone Park, N. Y.

Application November 13, 1934, Serial No. 752,866

8 Claims. (Cl. 184—1.5)

The invention relates to automobile service lifts, particularly adapted for use in connection with automobile service stations, and has for its object to provide a device of this character comprising a main casing in which is slidably mounted an auxiliary casing or tube carrying the vehicle receiving platform and means whereby air may be forced axially upwardly in the main casing and into the lower end of the auxiliary casing or tube for forcing said tube and the platform upwardly for a hoisting operation, to allow an operator to work on an automobile supported on the platform.

A further object is to provide oil drain means from the platform to a storage tank whereby oil drained from the crank case of an automobile may be conveyed to a storage point. Also to provide means whereby lubricant under pressure may be supplied to the operator adjacent the platform for lubricating purposes.

A further object is to provide a chamber within the main tube around the auxiliary tube, and into which lubricant is discharged from the platform through means extending through the auxiliary tube, and drainage means from said chamber.

A further object is to provide pipe means connected to the main tube and having a flexible pipe connection within the chamber of the main tube around the auxiliary tube and discharging lubricant for lubricating purposes into a pipe extending upwardly through the auxiliary tube; also, to provide means for supplying air pressure to the pipe line extending into the tubes for the hoisting operation and to the grease supplying pipe line.

A further object is to provide a pivotal connection between the platform and the upper end of the auxiliary tube so that said platform can be rotated in a horizontal plane when so desired.

A further object is to provide a pivotal connection in the drain pipe line from the platform to the upper end of the upper tube and extending through the pivotal point of the platform.

A further object is to provide the platform at one side thereof with a longitudinal drain trough into which lubricant drains from a crank case through a transverse trough; and to mount the transverse trough in a manner whereby it may be longitudinally adjusted for positioning the same below the crank case of a vehicle mounted on the platform.

A further object is to provide an automobile service lift comprising telescopically engaged vertically disposed members having a platform pivotally mounted for rotation in a horizontal plane thereon with oil supply and drainage means to and from the platform and all concealed within the telescopically engaged members.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a view in elevation of the lift, parts being shown in section to better illustrate the structure.

Figure 2 is a vertical longitudinal sectional view through the lift.

Figure 3 is a top plan view of the lift showing the platform carried thereby.

Figure 4 is a vertical longitudinal sectional view through one of the pivoted arms carried by the platform for conveying lubricant as drained from the crank case.

Figure 5 is a vertical longitudinal sectional view through the air controlled detent.

Referring to the drawings, the numeral 1 designates the main cylinder of the hoist, the lower end of which is preferably provided with a cap 2, and is imbedded in a concrete foundation 3. Disposed within the upper end of the main cylinder 1 is an auxiliary cylinder 4, which is of smaller diameter, thereby forming an annular oil receiving chamber 5 within the cylinder 1, the purpose of which will presently appear. The lower end of the auxiliary cylinder 4 is provided with a packed piston head 6 having apertures 7 and 8 therethrough, the aperture 8 being centrally disposed as clearly shown in Figure 2. Mounted on the upper end of the main cylinder 1 is a bearing ring 9, preferably formed in sections and in which is slidably mounted at 10 the upper end of the auxiliary cylinder 4, so that said cylinder is guided in its upward and downward movement during a hoisting and lowering operation. Figure 2 shows the parts in raised position.

Formed within the chamber 11 of the auxiliary cylinder 4 is a partition 12, which divides the chamber 11 from the upper chamber 13 and against which partition air pressure is exerted for the hoisting operation. Air is supplied to the chamber 11 through the air supply pipe 14 which extends downwardly into the concrete base 3 and thence upwardly with its vertical portion 15 extending upwardly through the oil 16 in the lower cylinder 1, and through the large opening 8 in the piston head 6 of the auxiliary cylinder and terminates in the chamber 11 above the oil level, as clearly shown in Figure 2. When the cylinder 4 is in lowered position and it is desired to hoist an automobile on the platform 17, air is forced through the pipe 15 and the air pressure will force the auxiliary cylinder 4 upwardly.

As the cylinder 4 moves upwardly it is checked in its movement by the passage of the oil 16 through the apertures 7 and 8 which act as a dash pot for controlling the speed of operation of the cylinder 4 in its upward or downward movement. Air supply pipe 14 leads to a source of air supply through the pipe 18 controlled by the valve 19 and during the lowering operation the valve 19 is closed and the valve 20 is opened thereby allowing an exhaust of air at 21 to the atmosphere.

The vehicle receiving platform 17 comprises oppositely disposed wheel receiving channel members 22 connected together by cross bars 23, which are provided with a plate 24 on their upper sides, and which plate is rotatably mounted at 25 on the bearing 26 formed by the lubricant drain pipe 26a. The transverse bars 23 are provided with U-shaped brackets 27, which arch the opposite sides of the round plate 28 secured to the upper end of auxiliary cylinder 4, therefore it will be seen that the platform 17 is rotatably mounted for rotation in a horizontal plane, thereby facilitating the oiling or greasing or repairing operation of the automobile, mounted on the platform. Secured by means of brackets 29 to the inner side of one of the channel platform members 22 is an oil drain pipe 30 having pivotally connected to its ends at 31 troughs 32, in which are laterally adjustable drain pans 33, adapted to be positioned under the crank casing of an automobile for an oil draining operation. Connected to the pipe 30 is an inwardly extending pipe 34 which has its end 35 pivotally mounted in the upper end of the oil drain pipe 26a within the upper cylinder 4. The oil drain pipe 26a extends downwardly through the cylinder 4 and thence laterally at 36 and discharges into the annular chamber 5 around the upper cylinder 4, therefore it will be seen that the drained oil drains through the device.

The oil from the annular oil chamber 5 passes by gravity through the discharge pipe 37 to the storage tank 38 from which it may be removed by a pumping operation through the clean out pipe 39. It will be noted that a drainage means is provided from the platform for the oil which passes entirely through the cylinders until it is discharged in the storage tank 38, thereby obviating outside drainage connection.

The auxiliary cylinder 4 is held in various raised positions by means of a pivoted dog 40 disposed to one side thereof and provided with a nose 41 adapted to be received beneath any of the ratchet teeth 42 carried by the side of the cylinder 4, therefore it will be seen that the dog will positively hold the platform in any raised position and will not rely upon air pressure for this purpose which is the difficulty with devices of this general character. The dog 40 is pivotally mounted at 43 and is raised or lowered by a vertically movable plunger 44 which is forced upwardly by air supplied to the lower end thereof through an air supply pipe 45 which leads to an air supply controlled by a valve 46, therefore it will be seen that during the manipulation of the device the dog may be raised by air for releasing the cylinder 4 for the lowering operation. In starting this operation, air is supplied to the hoisting mechanism for slightly raising the cylinder 4 for allowing disengagement of the nose 41 with the ratchet teeth 42. Pipe 45 is provided with an exhaust valve 47, which when opened allows exhaust of air at 48 to the atmosphere, hence it will be seen that the operator will at all times have full control of the hoist.

During the servicing, inspection and repair of an automobile on the platform, it is necessary to lubricate the same, and to accomplish this object, a pipe line is provided for forcing lubricant, which is under pressure in a conventional form of tank 49 through a pipe 50, which pipe is connected at 51 to the upper end of the main cylinder 1, as clearly shown in Figure 2. The pipe 50 has connected thereto within the chamber 5 a flexible pipe 52 which encircles the auxiliary cylinder 4 and has slack therein. The upper end of the flexible pipe 52 is connected to a vertically disposed pipe 53 which extends upwardly within the chamber 11 of the auxiliary cylinder 4 and extends through the partition 12 and terminates in branch pipes 54 to the outer ends of which may be connected flexible hose members 55, which may lead to nozzles of the spraying type. It will be noted by providing two branch pipes 54 that a lubricating operation may be expedited as more than one operator can lubricate at the same time.

From the above it will be seen that a fluid pressure automobile hoist is provided in which the parts are telescopically engaged, provided with dash pot means for braking the operation thereof and that lubricant drain and supply means is provided in connection with said hoist which automatically adjusts itself according to the elevation of the platform. It will also be seen that said lubricant drainage and supply means is disposed within the telescopically engaged members where they are concealed from view and that the drain lubricant is collected in a cylinder chamber around the auxiliary cylinder 4, from which it is drained to a storage tank, and that this cylinder chamber is utilized for the reception of a flexible pipe loop in the oil supply pipe line.

The invention having been set forth what is claimed as new and useful is:

1. The combination with a vehicle hoist comprising telescopically engaged sections one within the other and the inner section being of smaller exterior diameter than the interior diameter of the other section thereby forming an annular chamber, a lubricant supply pipe connected to the larger section, a lubricant discharge pipe extending upwardly within the smaller section to a point of discharge and a flexible connection between said pipes and disposed within the annular chamber.

2. The combination with a vehicle hoist comprising telescopically engaged sections, a lubricant supply pipe connected to one of said sections, a lubricant discharge pipe carried by the other section, of an extensible connection between the lubricant supply and discharge pipes within one of said telescopic sections and forming means whereby lubricant may be supplied to the discharge pipe upon extension of the sections.

3. A device as set forth in claim 2 wherein one of said sections is smaller than the interior diameter of the other section thereby forming an annular chamber and wherein the extensible connection includes a flexible pipe connection between the supply and discharge pipes, said flexible connection being disposed in the annular chamber.

4. A device as set forth in claim 2 wherein the extensible connection includes a flexible connection between the supply and discharge pipe, said flexible connection being disposed within one of the sections, and being extensible upon extension of one of the telescopic sections.

5. The combination with an extensible hoist comprising telescopic sections, one slidable within the other, the inner section being smaller than the outer section, thereby forming a chamber between the sections, a fixed discharge pipe carried by the inner section, a fixed lubricant supply pipe connected to the outer section and means for conveying lubricant from said supply pipe through said chamber to the discharge pipe.

6. The combination with an extensible telescopic hoist formed from a plurality of slidably connected sections, said sections having a chamber between the same, a lubricant discharge pipe carried by one of said sections, a lubricant supply pipe connected to the other section, of a pipe connection between the supply and discharge pipes and disposed entirely in the chamber between the walls of the telescopic sections and forming means whereby a lubricant pipe line is maintained from supply to discharge pipe when the sections are extended.

7. The combination with an extensible hoist comprising telescopic sections having a chamber formed between the walls thereof, of means for supplying lubricant to a discharge pipe adjacent the upper end of the upper section, said means passing through the chamber.

8. A device as set forth in claim 7 wherein the means for supplying lubricant to the discharge pipe includes a flexible pipe having slack therein.

THOMAS A. MARTIN.